(12) United States Patent
Saha et al.

(10) Patent No.: US 8,775,708 B2
(45) Date of Patent: Jul. 8, 2014

(54) INCREASING FUNCTIONALITY OF A READER-WRITER LOCK

(71) Applicant: Intel Corporation, Santa Clara, CA (US)

(72) Inventors: Bratin Saha, Santa Clara, CA (US); Ali-Reza Adl-Tabatabai, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/778,318

(22) Filed: Feb. 27, 2013

(65) Prior Publication Data

US 2013/0173869 A1 Jul. 4, 2013

Related U.S. Application Data

(60) Division of application No. 13/325,688, filed on Dec. 14, 2011, now Pat. No. 8,407,386, which is a continuation of application No. 11/392,381, filed on Mar. 29, 2006, now Pat. No. 8,099,538.

(51) Int. Cl.
| | |
|---|---|
| *G06F 12/00* | (2006.01) |
| *G06F 12/14* | (2006.01) |
| *G06F 13/00* | (2006.01) |
| *G06F 13/28* | (2006.01) |

(52) U.S. Cl.
USPC ............ 710/200; 711/147; 711/150; 711/152

(58) Field of Classification Search
USPC ........................... 710/200; 711/147, 150, 152
See application file for complete search history.

(56) References Cited

U.S. PATENT DOCUMENTS

| 4,604,694 | A | | 8/1986 | Hough |
| 5,161,227 | A | | 11/1992 | Dias |
| 5,247,672 | A | | 9/1993 | Mohan |
| 5,261,108 | A | | 11/1993 | Hayashi |
| 5,263,155 | A | * | 11/1993 | Wang ............................ 707/695 |
| 5,263,161 | A | | 11/1993 | Barth et al. |
| 5,287,521 | A | | 2/1994 | Nitta |
| 5,293,627 | A | * | 3/1994 | Kato et al. .................... 713/503 |

(Continued)

FOREIGN PATENT DOCUMENTS

| CN | 101556597 B | * | 3/2011 | ............... G06F 17/30 |
| EP | 0854419 A2 | * | 7/1998 | ................ G06F 9/46 |

(Continued)

OTHER PUBLICATIONS

"NN910448: Method for Dynamic Variation of Concurrency Control", Apr. 1, 1991, IBM, IBM Technical Disclosure Bulletin, vol. 33, Iss. 11, pp. 48-50.*

(Continued)

*Primary Examiner* — Faisal M Zaman
(74) *Attorney, Agent, or Firm* — Trop, Pruner & Hu, P.C.

(57) ABSTRACT

In one embodiment, the present invention includes a method for accessing a shared memory associated with a reader-writer lock according to a first concurrency mode, dynamically changing from the first concurrency mode to a second concurrency mode, and accessing the shared memory according to the second concurrency mode. In this way, concurrency modes can be adaptively changed based on system conditions. Other embodiments are described and claimed.

13 Claims, 6 Drawing Sheets

(56) References Cited

U.S. PATENT DOCUMENTS

| | | | |
|---|---|---|---|
| 5,303,368 A | | 4/1994 | Kotaki |
| 5,410,697 A | | 4/1995 | Baird et al. |
| 5,561,794 A | | 10/1996 | Fortier |
| 5,586,331 A | | 12/1996 | Levenstein |
| 5,598,562 A | | 1/1997 | Cutler |
| 5,623,670 A | * | 4/1997 | Bohannon et al. ............ 717/200 |
| 5,649,102 A | | 7/1997 | Yamauchi |
| 5,675,622 A | | 10/1997 | Hewitt |
| 5,774,731 A | | 6/1998 | Higuchi |
| 5,860,159 A | | 1/1999 | Hagersten |
| 5,892,955 A | | 4/1999 | Ofer |
| 5,899,993 A | | 5/1999 | Jenkins |
| 5,968,157 A | | 10/1999 | Joy |
| 5,983,326 A | * | 11/1999 | Hagersten et al. ............ 711/147 |
| 5,991,845 A | | 11/1999 | Bohannon |
| 6,041,385 A | | 3/2000 | Shipman |
| 6,076,126 A | | 6/2000 | Shagam |
| 6,148,300 A | * | 11/2000 | Singhal et al. ......... 1/1 |
| 6,199,094 B1 | | 3/2001 | Presler-Marshall |
| 6,237,019 B1 | | 5/2001 | Ault |
| 6,304,938 B1 | * | 10/2001 | Srivastava ............ 710/200 |
| 6,343,338 B1 | | 1/2002 | Reneris |
| 6,480,918 B1 | | 11/2002 | Mckenney et al. |
| 6,546,443 B1 | | 4/2003 | Kakivaya et al. |
| 6,658,513 B1 | | 12/2003 | Boonie |
| 6,823,511 B1 | * | 11/2004 | McKenney et al. ............ 718/102 |
| 6,826,570 B1 | | 11/2004 | Eshel et al. |
| 6,842,809 B2 | | 1/2005 | Browning |
| 6,850,938 B1 | * | 2/2005 | Sadjadi ............ 1/1 |
| 6,850,969 B2 | | 2/2005 | Ladan-Mozes et al. |
| 6,898,650 B1 | | 5/2005 | Gao et al. |
| 6,922,744 B1 | | 7/2005 | Sipple |
| 6,952,829 B1 | | 10/2005 | Banavar et al. |
| 7,120,762 B2 | | 10/2006 | Rajwar et al. |
| 7,395,382 B1 | * | 7/2008 | Moir ............ 711/147 |
| 7,434,010 B2 | | 10/2008 | Duffy et al. |
| 7,711,909 B1 | * | 5/2010 | Lev et al. ............ 711/156 |
| 7,725,633 B2 | | 5/2010 | Mochida et al. |
| 8,099,538 B2 | * | 1/2012 | Saha et al. ............ 710/200 |
| 8,209,689 B2 | * | 6/2012 | Raikin et al. ............ 718/100 |
| 8,407,386 B2 | * | 3/2013 | Saha et al. ............ 710/200 |
| 2002/0099703 A1 | | 7/2002 | Whang |
| 2002/0147873 A1 | | 10/2002 | Kwon |
| 2002/0147969 A1 | | 10/2002 | Lethin |
| 2003/0208662 A1 | | 11/2003 | Heisch |
| 2004/0019660 A1 | | 1/2004 | E. |
| 2004/0117531 A1 | * | 6/2004 | McKenney ............ 710/200 |
| 2004/0143712 A1 | | 7/2004 | Armstrong et al. |
| 2005/0204119 A1 | | 9/2005 | Saha et al. ............ 712/235 |
| 2006/0005197 A1 | | 1/2006 | Saha et al. ............ 718/104 |
| 2008/0256074 A1 | | 10/2008 | Lev et al. |
| 2010/0153953 A1 | | 6/2010 | Adl-Tabatabai |
| 2010/0191884 A1 | | 7/2010 | Holenstein et al. |
| 2011/0185359 A1 | | 7/2011 | Chakrabarti |

FOREIGN PATENT DOCUMENTS

| | | | |
|---|---|---|---|
| JP | 58105362 A | | 6/1983 |
| JP | 62200449 | | 9/1987 |
| JP | 02300939 A | | 12/1990 |
| JP | 04116762 A | | 4/1992 |
| JP | 05143372 A | | 6/1993 |
| JP | 07160645 | | 6/1995 |
| JP | 08006905 | | 1/1996 |
| JP | 09231123 | | 9/1997 |
| JP | 2001075826 | | 3/2001 |
| JP | 2004227581 | | 8/2004 |
| JP | 2009193362 | | 8/2009 |
| WO | WO 03042810 A1 | | 5/2003 |
| WO | WO 2008018963 A1 | * | 2/2008 ............. G06F 12/16 |

OTHER PUBLICATIONS

Eric G.; Julien, H.: Jean-Christophe, L., "Comparison of optimisite and pessimistic pilgrims for concurrency management in CSCW through a probabilistic study," Information Technology: Research and Education, 2005. ITRE 2005. 3rd International Conference on , pp. 307,311, Jun. 27-30, 2005.*

Carns et al., "A Case for Optimistic Coordination in HPC Storage Systems," High Performance Computing, Networking, Storage and Analysis (SCC), 2012 SC Companion: , pp. 48,53, Nov. 10-16, 2012.*

Makni, A.; Bouaziz, R., "Performance Evaluation of an Optimistic Concurrency Control Algorithm for Temporal Databases," Advances in Databases Knowledges and Data Applications (DBKDA), 2010 Second International Conference on , pp. 75,81, Apr. 11-16, 2010.*

U.S. Appl. No. 11/305,506, filed Dec. 16, 2005, entitled "Speculative Execution PAS A Barrier" by Bratin Saha, Ali-Reza Adl-Tabatabai.

U.S. Appl. No. 11/304,509, filed Dec. 14, 2005, entitled "Lock Elision With Transactional Memory" by Ali-Reza Adl-Tabatabai et al.

Robert Ennals, "Software Transactional Memory Should Not Be Obstruction-Free," Nov. 2005, pp. 1-10.

"NB9402399: OS/2 Syystem Semaphore Limit Workaround", Feb. 1, 1994, IBM, IBM Technical Disclosure Bulletin, vol. 37, Iss. 26, pp. 399-406.

"NA9109455: Sixteen-bit Operating System Fast Safe RAM Semaphore Compatibility in an Intel 80386 Paged Environment", Sep. 1, 1991, IBM, IBM Technical Disclosure Bulletin, vol. 34, Iss. 4A, pp. 445-447.

Wanyu Kim; Dongkun Shin;, "Non-Preemptive Demand Paging Technique for NAND Flash-Based Real-Time Embedded Systems," Consumer Electronics, IEEE Transactions on, vol. 56, No. 3, Aug. 2010, pp. 1516-1523.

Tei-Wei Kuo; Ming-Chung Liang; LihChyun Shu;, "Abort-Oriented Concurrency Control for Real-Time Databases," Computers, IEEE Transactions on, vol. 50, No. 7, Jul. 2001, pp. 660-673.

U.S. Appl. No. 11/305,506, filed Dec. 16, 2005, entitled "Speculative Execution Past a Barrier" by Bratin Saha, Ali-Reza Adl-Tabatabai.

U.S. Appl. No. 11/304,509, filed Dec. 14, 2005, entitled "Lock Elision With Transactional Memory" b Ali-Reza Adl-Tabatabai et al.

Robert Ennals, "Software Transactional Memory Should Not Be Obstruction-Free", Nov. 2005, pp. 1-10.

"NA9109445: Sixteen-bit Operating System Fast Safe RAM Semaphore Compatibility in an Intel 80386 Paged Environment", Sep. 1, 1991, IBM, IBM Technical Disclosure Bulletin, vol. 34, Iss. 4A, pp. 445-447.

"NN9703207: Method for Initializing Semaphores that follow the UNIX System V Model", Mar. 1, 1997, IBM, IBM Technical Disclosure Bulletin, vol. 40, Iss. 3, pp. 207-208.

NN9607119: Blocking/Non Blocking Access to Message Queues, Jul. 1, 1996, IBM, IBM Technical Disclosure Bulletin, vol. 39, Iss. 7, pp. 119-120.

NA8911208: Bus-Locking Mechanism in an Intel 82385 Cache Controller Subsystem, Nov. 1, 1989, IBM, IBM Technical Disclosure Bulletin, vol. 32, Iss. 6A, pp. 2208-2210.

* cited by examiner

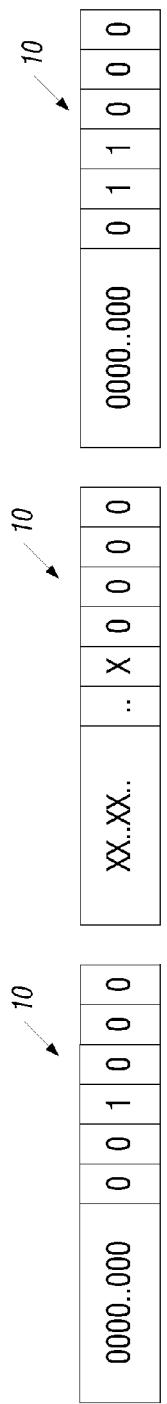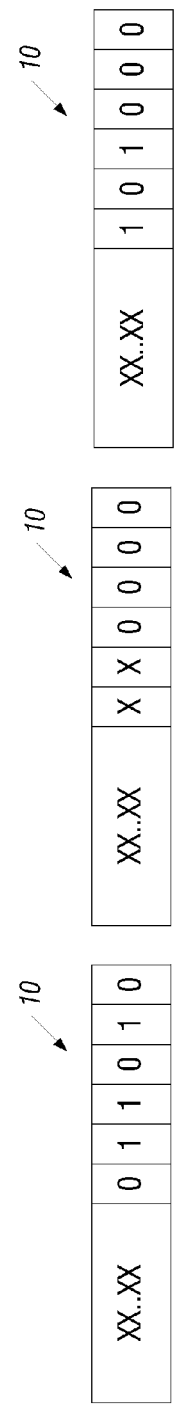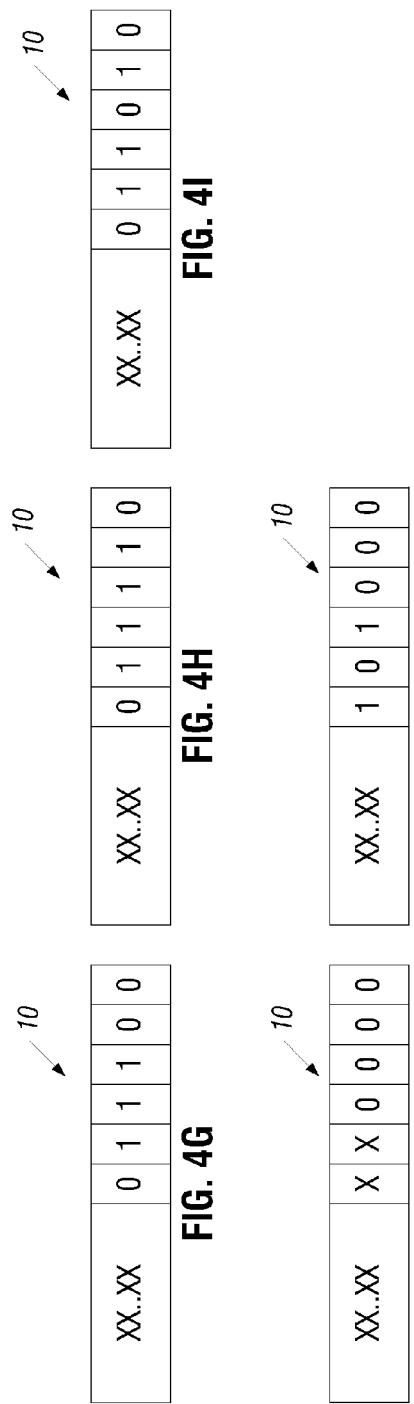

INCREASING FUNCTIONALITY OF A READER-WRITER LOCK

This application is a divisional of U.S. patent application Ser. No. 13/325,688, filed Dec. 14, 2011, which is a continuation of U.S. patent application Ser. No. 11/392,381, filed Mar. 29, 2006, now U.S. Pat. No. 8,099,538, issued Jan. 17, 2012, the content of which is hereby incorporated by reference.

BACKGROUND

Embodiments of the present invention relate to computer systems, and more particularly to such systems that use lock variables to control access to data.

Computer systems including multiprocessor (MP) and single processor systems may include a plurality of threads, each of which executes program instructions independently from other threads. Use of multiple processors and/or threads allows various tasks or functions (and even multiple applications) to be handled more efficiently and with greater speed. When using multiple threads or processors, two or more processors or threads can share the same data stored within the system. However, care must be taken to maintain memory ordering when sharing data.

For data consistency purposes, if multiple threads or processors desire to read, modify, or write data at a shared memory location, the multiple agents may not be allowed to perform operations on the data simultaneously. Further complicating the use of multiple processors is that data is often stored in a cache associated with a processor. Because such caches are typically localized to a specific processor, multiple caches in a multiprocessor computer system can contain different copies of a given data item. Any agent accessing this data should receive a valid or updated (i.e., latest) data value, and data being written from the cache back into memory must be the current data so that cache coherency is maintained.

Multithreaded (MT) software uses different mechanisms to interact and coordinate between different threads. Two common forms of synchronization are barriers and semaphores (locks). A barrier mechanism helps a program to synchronize different threads at predefined points in the program, where each thread waits for a memory variable to reach a predetermined barrier level. Synchronization is achieved once all threads have completed the updates. When the barrier is reached, all threads can then proceed.

A semaphore lock mechanism is used to guarantee mutual exclusion across multiple threads while accessing a shared memory variable or structure (i.e., a shared element). In order to provide a unique and consistent view of the shared element, it is guarded by a lock variable. Different types of locks exist. For example, a spin-lock mechanism is typically implemented such that a thread needing access to the shared element must acquire the guarding lock (i.e., locking) via an atomic semaphore operation. When a lock is acquired, the remaining threads can only acquire the lock after it is released (i.e., unlocking) by the original requester. Locking is performed by designating a particular value to represent a locked state, and a different value to represent an unlocked state.

Reader-writer locks allow multiple concurrent readers or a single writer to acquire the lock at any time. Reader-writer locks are used in sophisticated concurrent systems, for example, in implementing a software transaction memory (STM). To design software applications to scale for multi-core processors, reader-writer locks may be used to allow concurrency and allow more parallelism to be exploited.

Many modern languages include transactions as the basic synchronization primitive. A hardware transactional memory (HTM) is insufficient for these languages since these languages use nested transaction, partial aborts, non-transactional instructions and a number of other features. An STM implementation can provide these features. However, the usual implementation of a STM is optimistic, as each thread executes operations in an atomic block as if no other threads exist. When the atomic block finishes, data accessed by the block is checked for consistency with current data at a given memory location. If consistency is verified, the transaction is committed; otherwise the atomic block is aborted and must be restarted. Typical locks, however, are not optimized for use in an STM.

BRIEF DESCRIPTION OF THE DRAWINGS

FIGS. 4A-4K are various bit patterns to represent different modes of a lockword in accordance with an embodiment of the present invention.

DETAILED DESCRIPTION

In various embodiments, a lock for a shared memory structure may be in the form of a data structure having two portions, namely a first portion and a second portion. The first portion may correspond to an identifier portion that is used to identify a write owner of the lock or an indication of the number of reader owners of the lock. The second portion may correspond to a control portion that may be accessed and written to by various entities (e.g., threads) to acquire access to the lock or to implement or change features or modes of operation of the lock.

In many implementations, the lock may be a reader-writer lock and may take the form of a data structure that can be sized differently in different embodiments. In one implementation, the lock may be a 32-bit structure that includes the first portion (i.e., an identifier portion) and the second portion (i.e., a control portion). In this implementation, the control portion may correspond to the low order 4 bits, while the identifier portion may correspond to the upper 28 bits, although the scope of the present invention is not so limited. The term "lockword" is used herein to refer to a lock variable in accordance with an embodiment of the present invention. Furthermore, while the term "lockword" is used throughout, it is to be understood that this term is not limited to any particular size of lock variable and instead a lockword may be any size desired for a particular implementation. Additional structures may be associated with a lockword, including a shared data structure that is to be accessed when a lock is acquired. Also, a mutual exclusion structure (MUTEX) may also be associated with the lockword. Furthermore, wait variables and the like may further be associated with the lockword as will be described below.

In various implementations, the control portion of the lock may be used to enable different lock features and modes of operation via a single control structure. Accordingly, entities may access the control portion, read its contents and/or write thereto in order to acquire the lock and/or modify properties or features of the lock. While only a few representative control mechanisms are described herein, it is to be understood that the scope of the present invention is not limited in this regard, and a lock may include other features and modes of operation controlled by elements in a control portion.

Figure 1:
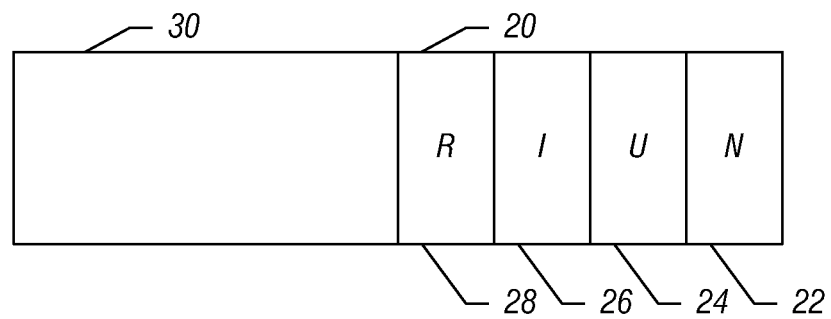
FIG. 1 is a block diagram of a lockword in accordance with one embodiment of the present invention.

Referring now to FIG. 1, shown is a block diagram of a lockword in accordance with one embodiment of the present invention. As shown in FIG. 1, lockword 10 includes a first portion 30 and a second portion 20. In the embodiment of FIG. 1, first portion 30 may correspond to an indicator portion, while second portion 20 may correspond to a control portion. In various implementations, the size of lockword 10 and its corresponding portions may be any desired size; however, in one embodiment lockword 10 may be a 32-bit word.

As further shown in FIG. 1, second portion 20 includes a plurality of subsisting elements. Specifically, a notify (N) element 22, an upgrade (U) element 24, an inflation (I) element 26 and a reader (R) element 28 may be present. More specifically, N element 22 may correspond to a bit 0 (b0); U element 24 may correspond to a bit 1 (b1); I element 26 may correspond to a bit 2 (b2); and R element 28 may correspond to a bit 3 (b3) of lockword 10. Although in one embodiment each of these elements may be a single bit and may correspond to a control indicator for different states of lockword 10 and its modes of operation, the scope of the present invention is not so limited.

In one embodiment, N element 22 may be used to indicate that a reader seeks notification after a writer has acquired and released lockword 10. In addition to writing to N element 22, a reader may also store an identifier in a wait variable or other location. The reader performs these operations after acquiring the reader lock but before it has released the reader lock. This operation may be idempotent; that is, even if multiple readers want notification a single bit suffices to tell the writer to wake up all readers waiting at a corresponding wait variable. Because a reader can not acquire the lock (and hence will not try to set the notification bit) when a writer has acquired the lock, there is no race condition between setting this N element and a writer waking up the readers, since the writer wakes up the readers only at the time of release. In one embodiment, this scheme of notification allows an implementation via instructions to monitor a memory region and wait for a store thereto, e.g., MONITOR and MWAIT instructions in an Intel Architecture (IA)-32 environment. In one embodiment, N element 22 may be written using a bit test and set instruction (e.g., the BTS instruction in an IA-32 environment).

In one embodiment, U element 24 may be used as an upgrade indicator. If a reader needs to be upgraded to a writer, it atomically tries to set U element 24. If it succeeds, it waits until all readers have released their read locks. Correspondingly, if a would-be writer or reader sees U element 24 set, it does not try to acquire lockword 10. When all readers have released their locks, the upgrader acquires lockword 10 as a write lock. If it fails to atomically set U element 24, the reader may stop trying to upgrade itself to a writer. Depending on the context in which the reader-writer lock is being used, the reader may take further actions; for example, if the reader is executing a software transaction, then it may abort its transaction. In one embodiment, to effect the abort, the reader may release all locks it has acquired.

In one embodiment, I element 26 may be used as an inflation indicator. It may be set to one if lockword 10 is inflated, and to zero if lockword 10 is not inflated. Operation using I element 26 will described further below. In one embodiment, a reader indicator, i.e., R element 28, may be always set to zero if a writer has acquired lockword 10 otherwise it may be set to one.

While these particular features and states for the control elements of control portion 20 have been described, it is to be understood that the scope of the present invention is not limited in this regard and in other embodiments fewer, additional, or different elements and indicators for different modes of operation or features can be present.

Figure 2:
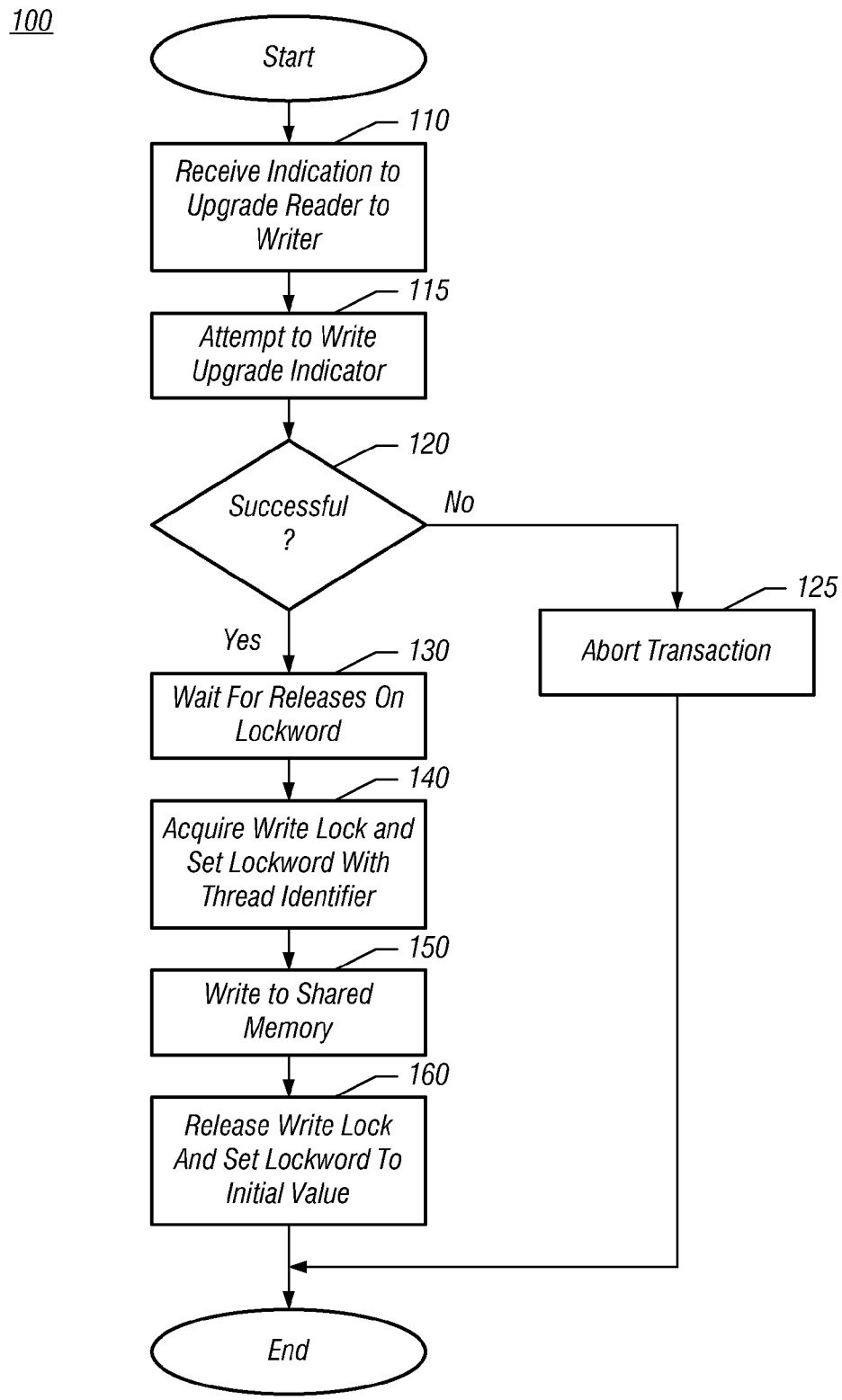
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to perform an upgrade of a reader to a writer status and to acquire a write lock on the lockword. In various embodiments, method 100 may be implemented in software, firmware, hardware or a combination thereof. For example, a processor core may be programmed to enable a thread to upgrade its status to a write status and acquire the lockword in order to write data to a shared memory associated with the lockword.

As shown in FIG. 2, method 100 may begin by receiving an indication to upgrade a reader to a writer status (block 110). For example, when a given thread previously having read access to a shared memory location desires to write data to the shared memory location, it may seek to upgrade to writer status. Accordingly, the thread may attempt to write to an upgrade indicator of the lockword (block 115). Next, it may be determined whether the attempt to set the upgrade indicator was successful (diamond 120). If the attempt was unsuccessful, e.g., the upgrade attempt failed because another entity has already sought to be upgraded or for another reason, control passes to block 125. There, a transaction of the thread may be aborted (block 125). For example, the thread may be processing a transaction, e.g., of a software transaction memory (STM). Because it cannot fully complete the transaction (i.e., because it cannot write data to the shared memory location associated with the lockword), the transaction is aborted. Accordingly, various activities to abort the transaction, e.g., rolling back data, releasing other locks and the like may be performed. At this point, method 100 may conclude.

Still referring to FIG. 2, if instead at diamond 120 it is determined that the attempt to set the upgrade indicator was successful, control passes to block 130. There, the thread may wait for release of any reader locks on the lockword (block 130). For example, one or more readers may have previously acquired a lock on the lockword. Accordingly, the thread may wait for the lockword to be released prior to performing further activities with respect to the lockword.

Upon release of the lockword, the thread may acquire a write lock and set the lockword with its thread identifier (TID) (block 140). In one implementation, the write lock may be acquired by setting predetermined values for the elements or bits within the control portion of the lockword. Furthermore, to identify itself as the owner of the lockword, the thread may insert its thread identifier into the first portion (i.e., indicator) portion of the lockword. Accordingly, at this time the thread has successfully gained ownership of the lockword and thus may write data to the shared memory location associated with the lockword (block 150).

After this write, the thread may release the write lock and set the lockword to its initial value (block 160). For example, the thread may clear its TID from the control portion and may further place a predetermined value in the control portion. This predetermined value may correspond to an initial value of the control portion, in some embodiments. In one implementation, the initial value may correspond to a value of 0□8, although the scope of the present invention is not so limited. Note that the events performed in blocks 130, 140, 150 and 160 may also correspond to the events for obtaining a write lock (without first upgrading from reader status).

After release of the write lock, method 100 may conclude. While described with this particular implementation in the embodiment of FIG. 2, it is to be understood that the scope of the present invention is not so limited and in other embodiments, other manners of upgrading a reader to a writer status and other manners of acquiring a write lock and releasing the same may be realized.

In various embodiments, reader-writer locks can be used in multiple modes of operation. More specifically, these reader-writer locks can be used in multiple concurrency schemes, namely an optimistic concurrency mode and a pessimistic concurrency mode. In an optimistic concurrency mode, readers read data associated with the shared memory of a lockword without taking any form of lock and using the data as desired. When the reader reaches a commitment phase (e.g., of a transaction using the data), the lockword is analyzed to validate the data by confirming that the value of the lockword has not changed since the reader read the data. In this way, the reader validates that the value of the data read has not changed. Such optimistic concurrency can be relatively efficient and provide for improved caching effects.

However, optimistic concurrency can lead to a high number of abort operations when used in a STM, at least during certain execution periods. That is, when the data associated with a lockword is modified after it has been read by a reader and before the reader commits the operation that used the data, that operation and other pending operations, e.g., of a transaction are aborted to avoid data inconsistencies. Accordingly, depending on given system conditions, a lockword may be used instead in a pessimistic concurrency scheme. In such a pessimistic concurrency scheme, reader-writer locks enable read concurrency, but explicitly prevent writers from accessing the data while a read lock is present. Thus the data remains coherent, however performance can be degraded, as a writer cannot acquire the lockword (and the associated shared memory) until the one or more readers have released the lockword.

In various embodiments, an adaptive approach may be used to switch between these different concurrency modes based on system conditions. In some embodiments, a control element within the control portion of the lockword may be used to enable adaptive switching between these concurrency modes. Referring back to FIG. 1, inflation element 26 may be used to indicate a change of mode of operation. Specifically, setting inflation element 26 may inflate operation from an optimistic form of concurrency to a pessimistic form of concurrency, or vice versa in some embodiments.

Figure 3:
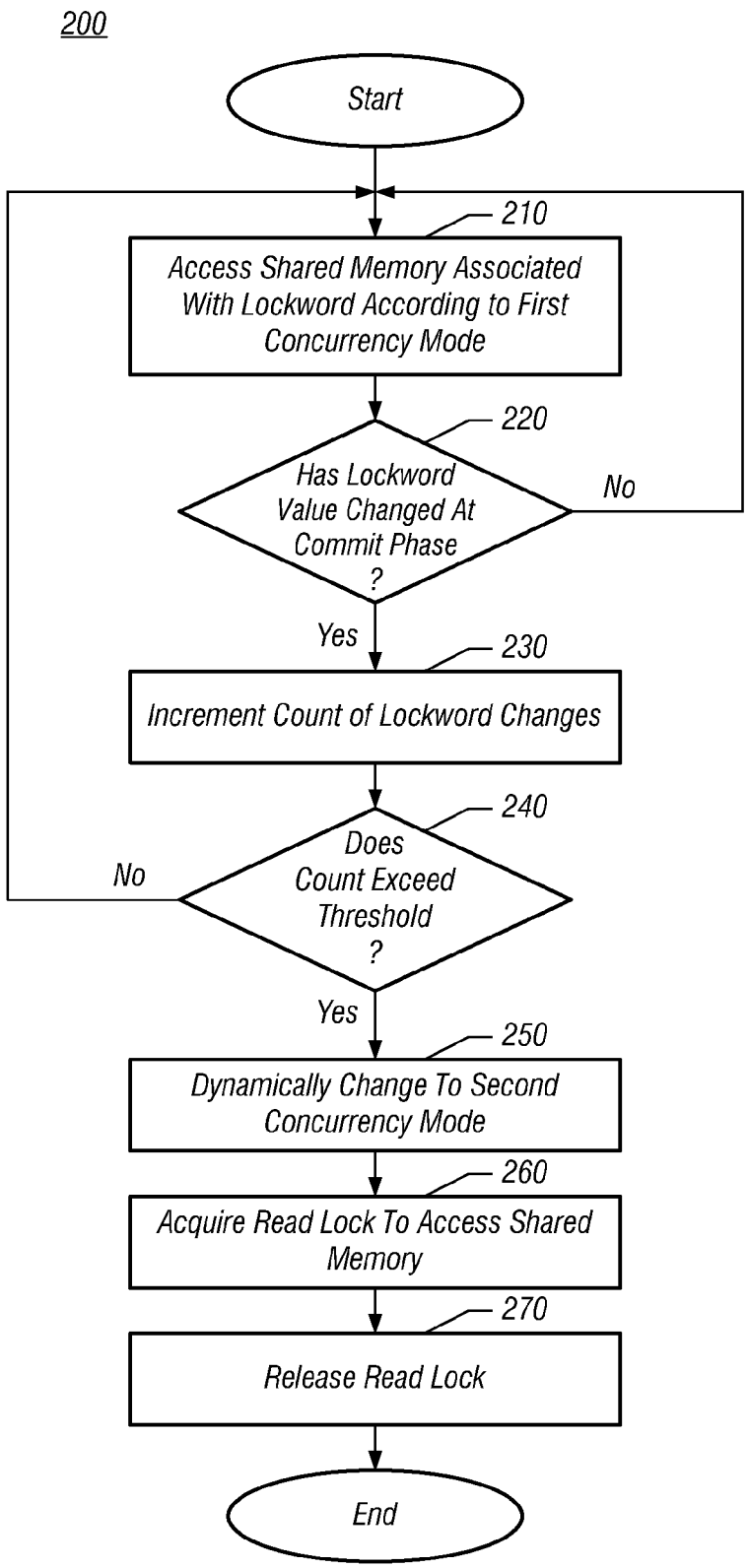
FIG. 3 is a flow diagram of a method including adaptive switching of concurrency modes in accordance with an embodiment of the present invention.

Different manners of providing for adaptive switching between concurrency modes may be realized. Referring now to FIG. 3, shown is a flow diagram of a method enabling adaptive switching of concurrency modes in accordance with an embodiment of the present invention. As shown in FIG. 3, method 200 may begin by accessing shared memory associated with a lockword according to a first concurrency mode (block 210). This first concurrency mode may correspond to an optimistic concurrency mode in which a reader may access data at a shared memory location without first acquiring a lock on the lockword. Next, the reader, which may correspond to a given thread, may use the data as desired, e.g., in performing an operation according to an instruction. When the reader gets to the commit phase of the transaction, it may be determined whether the lockword value has changed (diamond 220). In one manner, when the thread reads the data, it may also read the lockword and store the then pending value of the lockword at a given memory location (not shown in FIG. 3). Then at instruction commit time, the thread may compare the previously-stored value with the current value of lockword to determine whether they match. If at diamond 220 it is determined that the values match (in other words the lockword value has not changed), the operation commits normally and normal operation continues. As one example of such operation, control may pass back to block 210 where the shared memory may be accessed by the same thread or different threads, as desired.

Still referring to FIG. 3, if instead at diamond 220 it is determined that the lockword value has changed, in other words that the data at the shared memory location has changed, control passes to block 230. There, a count of changed lockwords may be incremented (block 230). For example, such a count may be maintained for a group of lockwords. In different embodiments, the group may correspond to some logical grouping such as lockwords accessed by a given thread or lockwords associated with certain transactions or the like. Note that in some embodiments, this count may be maintained for a given time interval before the count is reset.

Still referring to FIG. 3, next it may be determined whether the count exceeds a threshold (diamond 240). This threshold may correspond to a number of lockword changes (which may also correspond to a number of transaction aborts occurring in the first concurrency mode). If it is determined that the count does not exceed the threshold, control passes back to block 210, where the same thread may again access the shared memory, e.g., in an effort to retry the transaction.

If instead at diamond 240 it is determined that the count exceeds the threshold, control passes to block 250. There operation of the lockword may be dynamically changed to the second concurrency mode (block 250). This concurrency mode may correspond to a pessimistic concurrency mode, in various implementations. According to such a pessimistic concurrency mode, in order to read data at a shared memory location corresponding to a lockword, the reader must first acquire a lock. Accordingly, control passes to block 260, where the thread may acquire a read lock in order to access the shared memory location (block 260). After reading the data at the shared memory location and performing other actions (e.g., committing the transaction within which the shared data was read), control passes to block 270, where the thread may release the read lock (block 270). Subsequently, a writer may acquire a lock on the lockword. Accordingly, method 200 may conclude.

While described with this particular implementation in the embodiment of FIG. 3, it is to be understood that the scope of the present invention is not limited in this regard and different manners of inflating and/or deflating between different concurrency modes may be realized. Furthermore, while FIG. 3 particularly describes inflation of a lockword from an optimistic concurrency mode to a pessimistic concurrency mode, it is further to be understood that the vice versa operation may also be performed. That is, if it is determined that the pessimistic concurrency mode is negatively affecting performance, the lockword may be adaptively reconfigured to operate in the optimistic concurrency mode, e.g., to improve cache operation.

Referring now to FIGS. 4A-4K, shown are various bit patterns to represent different modes of a lockword in accordance with an embodiment of the present invention. Note that in the described figures, a value of x is used to denote a bit value that can be either zero or one. FIG. 4A shows a bit pattern of an initial state of a lockword. As shown in FIG. 4A, the control portion of the lockword corresponds to a value of 0□8, as there are no writers and no readers. Note that the lower 4 bits (for notification, upgrades, or inflation) may be used only when readers have acquired the lock. When a writer has the lock, none of this functionality is used. Thus the bit pattern is invariant, making the implementation efficient.

The algorithm for a reader acquiring a read lock may be as follows in Table 1, in one embodiment:

TABLE 1

1. temp = value of lockword
2. If lower 4 bits of temp are non-zero and upgrade bit is not set
   a. If CAS(&lockword, temp, temp + 0xF) succeeds,
      i. Reader lock acquired.
      ii. Add it to set of read locks acquired and return.
   b. Else goto step 1 (another got in ahead).
3. Else, goto step 1 (a writer has acquired or an upgraded reader is waiting).

In one embodiment, the algorithm for a reader releasing the lock may be as shown in Table 2:

TABLE 2

1. If notification is required (after a writer has subsequently acquired and released the lock), then set the notify bit, and add yourself to the corresponding wait variable.
2. Atomically decrement the value of lockword by 0xF.
3. Delete lock from read set Note that a reader increments the value of lockword by 0xF on acquire and decrements by the same on release. This ensures that the lower bits are unperturbed by the read lock operation. For example, if the notification bit was set, it does not get erased. Also, when a reader has the lock, the R indicator remains set.

To acquire a lock on the initial state of a lockword, a writer may clear the reader element to indicate a write lock, as shown in FIG. 4B. In one embodiment, a compare-and-swap (CAS) instruction may be used. Such an instruction may be in the form of a tuple (addr, oldValue, newValue) of an atomic compare-exchange (cmpxchg) operation, where the value at the location addr is compared to oldValue and if the two values are the same, then newValue is stored in the location. When the writer releases the lock, it may set the lockword to an initial value that signifies no current readers or writers, as shown in FIG. 4C.

In one embodiment, the algorithm for a writer acquiring the lock is as set forth in Table 3:

TABLE 3

1. If the lock is part of read set /* need to upgrade */
   a. Atomically try to set the upgrade bit
   b. If succeeds
      i. Release own read lock on the lockword.
      ii. Wait for all other current readers to release the read lock.
      iii. Acquire the write lock when there are no readers anymore (note that future readers and writers will not try to acquire the lock anymore since the upgrade bit has been set).
         1. Set lockword to (tid << 4).
      iv. If notify bit was set, then add lock to notify set so that sleeping readers can be notified on release, else add lock to write set.
      v. Return.

TABLE 3-continued c. Otherwise (upgrade attempt has failed)
      i. Abort transaction (this would imply that all locks are released and any other cleanup is performed).
2. temp = value of lockword.
3. If the upper bits (bit 4 - bit 32) temp are zero (this means there are no readers or writers)
   a. If the upgrade bit is not set
      i. If CAS(&lockword, temp, tid << 4) succeeds
         1. write lock was acquired
         2. If notify bit was set, (which is true if the notify bit in temp was set), then add lock to notify set, otherwise add lock to write set.
         3. Return.
      ii. Else goto step 2 /* someone got in ahead */
   b. Else, goto step 2 /* an upgraded reader is waiting */
4. Else, goto step 2 /* a writer or readers have the lock */

Note that when the lock is acquired, a thread identifier (TID) is shifted into the lockword. This preserves the invariant that when a writer has the lock, the lower four bits are always zero.

When the writer releases the lock, the bit pattern shown in FIG. 4C is present, with the control portion in its initial state. In one embodiment, the algorithm for a writer releasing the lock is shown in Table 4:

TABLE 4

1. If this lock was part of the notify set, then wake up readers sleeping on the corresponding wait variable.
2. Set lockword to 0x8.

The write lock release sets the lockword to the initial value. If some readers had asked for notification, then the writer wakes them up at the corresponding wait variable.

In optimistic concurrency, a lock is in two phases, it is either owned by a writer or it contains a version number. When a writer releases the lock, it increments the version number. Thus, the version number is a monotonically increasing function, and is guaranteed to change if a writer has acquired the lock. A reader never acquires the lock. During a read, a reader tests whether the lock is free, and if so remembers the version number of the lock. At commit, it tests the version number again and if the version numbers match, then no writer has acquired the lock in between. This may provide better cache effects than a reader-writer lock mechanism, as the optimistic versioning approach does not cause a store on a read operation.

In one embodiment, optimistic concurrency may have the R indicator set to one if the lockword contains a version number and zero if the lockword is owned by a writer. To perform a write lock acquire, a thread remembers the old version number, and as before inserts its TID (by left shifting by 4 bits). This preserves the invariant that the lower four bits on a write lock acquire are zero. On a lock release, the writer increments the old version number by 0xF. This ensures that the lower 4 bits remain unperturbed, in particular, the R indicator remains set, which gives a valid version number.

Embodiments of the present invention may thus provide for adaptivity between optimistic and pessimistic forms. The adaptive reader-writer lock structure may be arranged as follows in one embodiment:

```
typedef struct {
    volatile uint32 lockword;
    volatile uint32 readerLockMutex;
    volatile uint32 numReaderLockers;
} AdaptiveReaderWriterLock;
```

Every lockword may have an associated MUTEX, but the MUTEX is used only when inflation is in effect. Every lockword may also have an associated field that counts the number of readers that have acquired the read lock explicitly. Again, it is used only when inflation is in effect. Thus, given a lockword the associated MUTEX, as well as the count field can be obtained since they are arranged sequentially in memory. Implementations can choose to associate the lockword with the MUTEX and count fields in different ways.

To perform versioning with a reader, the algorithm of Table 5 may be used:

TABLE 5

1. temp = value of lockword
2. if lower 4 bits of temp are non-zero
   a. temp1 = temp with inflation bit masked off
   b. remember temp1 as the version number and return
3. Else, goto step 1.

Note that for obtaining the proper version number, the inflation indicator may be masked. A validation algorithm for the reader may be implemented as shown in Table 6, in one embodiment:

TABLE 6

1. temp = value of lockword
2. temp1 = temp with inflation bit masked off
3. if temp1 = remembered version number
   a. return True.
4. Else, return False.

Suppose a reader wants to perform read locking and not use versioning. Then the algorithm of Table 7 may be used, in one embodiment:

TABLE 7

1. temp = value of lockword
2. If lower 4 bits of temp are non-zero and upgrade bit is not set /* this means that a writer does not own the lock */
   a. Acquire the mutex (readerLockMutex) corresponding to lockword.
   b. Increment the number readers field (numReaderLockers)
   c. If inflation bit of temp is already set
      i. Release readerLockMutex
      ii. Add lock to read set
      iii. Return (read lock was acquired).
   d. Else (inflation bit of temp was not set)
      i. If CAS(&lockword, temp, temp | 0x4) succeeds /* this sets the inflation bit */
         1. Release readerLockMutex
         2. Add lock to read set
         3. Return (read lock was acquired).
      ii. Else
         1. Decrement numReaderLockers
         2. Release readerLockMutex
         3. Goto step 1.
3. Else, goto step 1 /* retry */

The read lock release in an adaptive scheme may work as shown in the algorithm of Table 8:

TABLE 8

1. Acquire the mutex (readerLockMutex) corresponding to lockword.
2. Decrement the number of readers (numReaderLockers).
3. If (numReaderLockers == 0)
   a. Reset the inflation bit in the lockword.

TABLE 8-continued

4. Release readerLockMutex.
5. Delete lock from read set.
6. Return.

Next, if one of the readers desires to upgrade to a writer status, the bit pattern of FIG. 4H may be present, in which the number of reader locks is decremented to one, and the inflation indicator (i.e., bit 1) is set to a value of 1. As shown in FIG. 4D, a reader desiring to be upgraded may set an upgrade indicator (i.e., bit 1) to a value of one. When the reader is upgraded, the bit pattern shown in FIG. 4E exists, indicating an acquired write lock. To acquire a write lock, the algorithm of Table 9 may be used:

TABLE 9

1. If the lock is part of read set /* need to upgrade */
   a. Atomically try to set the upgrade bit
   b. If succeeds
      i. Acquire readerLockMutex corresponding to lockword.
      ii. Decrement the number of reader lockers (numReaderLockers).
      iii. Release readerLockMutex.
      iv. Delete lock from my read set.
      v. Wait till numReaderLockers == 0.
      vi. Reset the inflation bit in the lockword.
      vii. temp = current value of lockword
      viii. temp1 = temp with N, U, and I bits masked off.
      ix. Remember temp1 as the old version number for the lockword.
      x. Set lockword to (tid << 4).
      xi. If notify bit was set, then add to notify set, else add to write set.
      xii. Return.
   c. Else (upgrade attempt has failed)
      i. Abort transaction.
2. temp = value of lockword.
3. If the lower bits (bit 0 - bit 3) of temp are non-zero, and the inflation bit is not set /* this means no one has taken a reader lock or writer lock */
   a. If the upgrade bit is not set
      i. If CAS(&lockword, temp, tid << 4) succeeds
         1. write lock was acquired
         2. If notify bit was set, then add to notify set, otherwise to write set
         3. Return.
      ii. Else, Goto step 2. /* someone got in ahead */
   b. Else, Goto step 2. /* an upgraded reader is waiting */
4. Else, Goto step 2. /* a writer or readers have the lock */

Note that this algorithm preserves the invariant that a write lock acquire sets the lower 4 bits to zero. When the lockword is inflated to a pessimistic mode of operation, the bit pattern shown in FIG. 4G is present in which the inflation indicator (i.e., bit 2) is set to a value of one. In the bit pattern of FIG. 4G, two explicit read lock acquires are present, as the indicator portion has a value of 2.

FIG. 4I shows a bit pattern prior to the upgrade in which all readers have released the read lock and the inflation indicator is now deflated. FIG. 4J shows the bit pattern after the reader upgrades to a writer status. The algorithm for a writer releasing the lock may be as shown in Table 10:

TABLE 10

1. If this variable was part of the notify set, then wake up readers sleeping on the corresponding wait variable.
2. Set lockword to (oldVersionNumber + 0xF).

The write lock release increments the version number by 0xF which means that the lower bits remain unperturbed including an R indicator, which preserves the invariant that it is set for a valid version number.

Finally, FIG. 4K shows the lockword when the write lock has been released (i.e., the control portion is back to its initial state) and the indicator portion is incremented with the next version number. Of course in other embodiments, different bit patterns to represent various states of the lockword and associated readers and writers may be realized.

Figure 5:
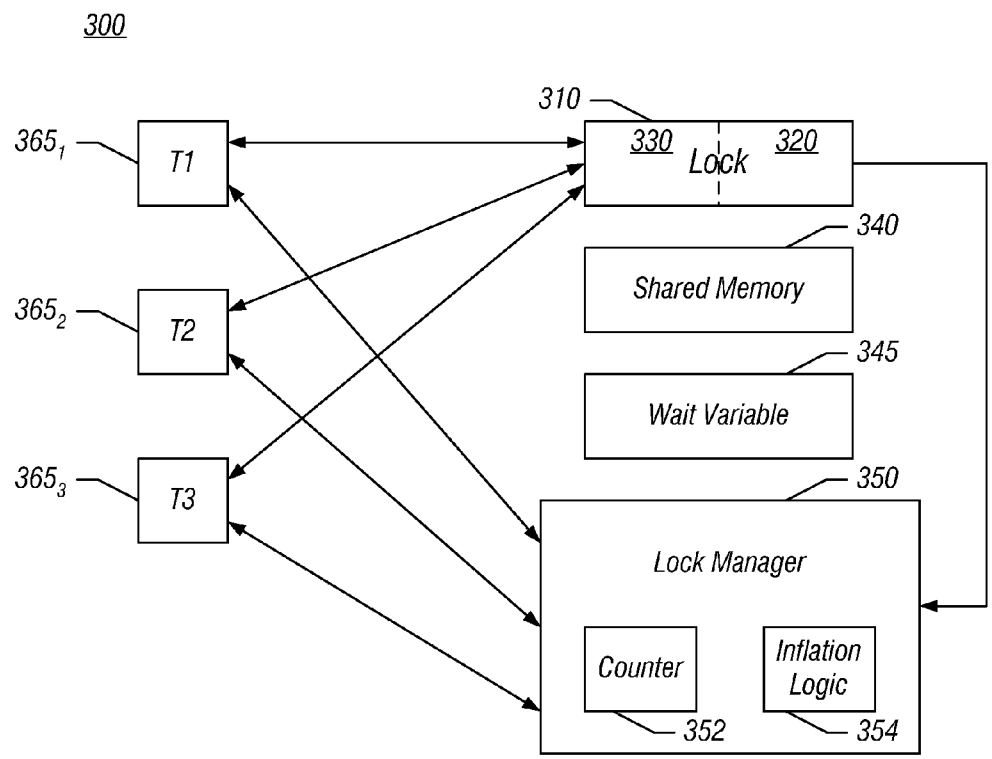
FIG. 5 is a block diagram of an implementation of a lock and associated shared memory in accordance with an embodiment of the present invention.

Referring now to FIG. 5, shown is a block diagram of an implementation of a lock environment in accordance with an embodiment of the present invention. As shown in FIG. 5, environment 300 may include a lockword 310 having a first portion 330 and a second portion 320. Lockword 310 may be in accordance with an embodiment of the present invention and may provide for control of various modes of operation and features via second portion 320. A count of reader locks or an identifier for a writer may be stored in first portion 330.

As shown in FIG. 5, lockword 310 may be associated with a shared memory 340, which may be a memory location that is protected by lockword 310. Additional memory locations may be present in environment 300, including, for example, a wait variable 345 which may be used to store addresses or other identifiers for threads desiring a notification when a writer releases a lock on lockword 310.

For purposes of illustration, FIG. 5 shows a plurality of threads, namely a first thread $365_1$ (i.e., thread T1), a second thread $365_2$ (i.e., thread T2), and a third thread $365_3$ (i.e., thread T3) (collectively generically thread 365). Each of threads 365 may be in communication with lockword 310 to read the values present and write values thereto, e.g., to acquire a lock or to signal a desired feature or mode of operation for lockword 310. While not shown specifically for ease of illustration of FIG. 5, it is to be understood that each of threads 365 may further be in communication with shared memory 340 and wait variable 345.

Furthermore, as shown in FIG. 5, each of threads 365 may be coupled to a lock manager 350, which may further be coupled to lockword 310. Lock manager 350 may be adapted to perform management or control activities with respect to lockword 310. In various embodiments, lock manager 350 may be implemented in software, hardware, firmware and/or a combination thereof. In one example embodiment, lock manager 350 may be implemented as a state machine, although the scope of the present invention is not so limited.

Lock manager 350 may be used to control a concurrency mode of operation for lockword 310. As one example, an initial configuration lockword 310 may be set for an optimistic concurrency mode to avoid the expense of acquiring locks and cache effects associated therewith. However by operating in an optimistic mode, one or more threads 365 may have to abort a transaction when a value of lockword 310 changes from the time that data in shared memory 340 is accessed and when an instruction related to the data later commits. Upon such aborts, a counter 352 within lock manager 350 may be incremented. Lock manager 350 may further include an inflation logic 354. Inflation logic 354 may be adapted to compare the value in counter 352 to a threshold. This threshold may correspond to a threshold number of transaction aborts. If greater than this threshold number of transaction aborts occurs, lock manager 350 may cause lockword 310 to be inflated to a pessimistic mode of operation. As described above, such mode of operation may be implemented by setting an inflation indicator within second portion 320, although the scope of the present invention is not so limited. While shown with this particular implementation in the embodiment of FIG. 5, it is to be understood that the scope of the present invention is not so limited.

As described above, reader-writer locks in accordance with an embodiment of the present invention may be used in connection with an STM. In such embodiments, transactions may be performed by threads in different concurrency modes, based upon a particular system operation. When operating in an optimistic concurrency mode, a thread may need to abort a transaction if a value of an accessed data associated with a lockword changes during use of the data. In a pessimistic concurrency mode, reader concurrency may be guaranteed at the expense of lower performance.

Figure 6:
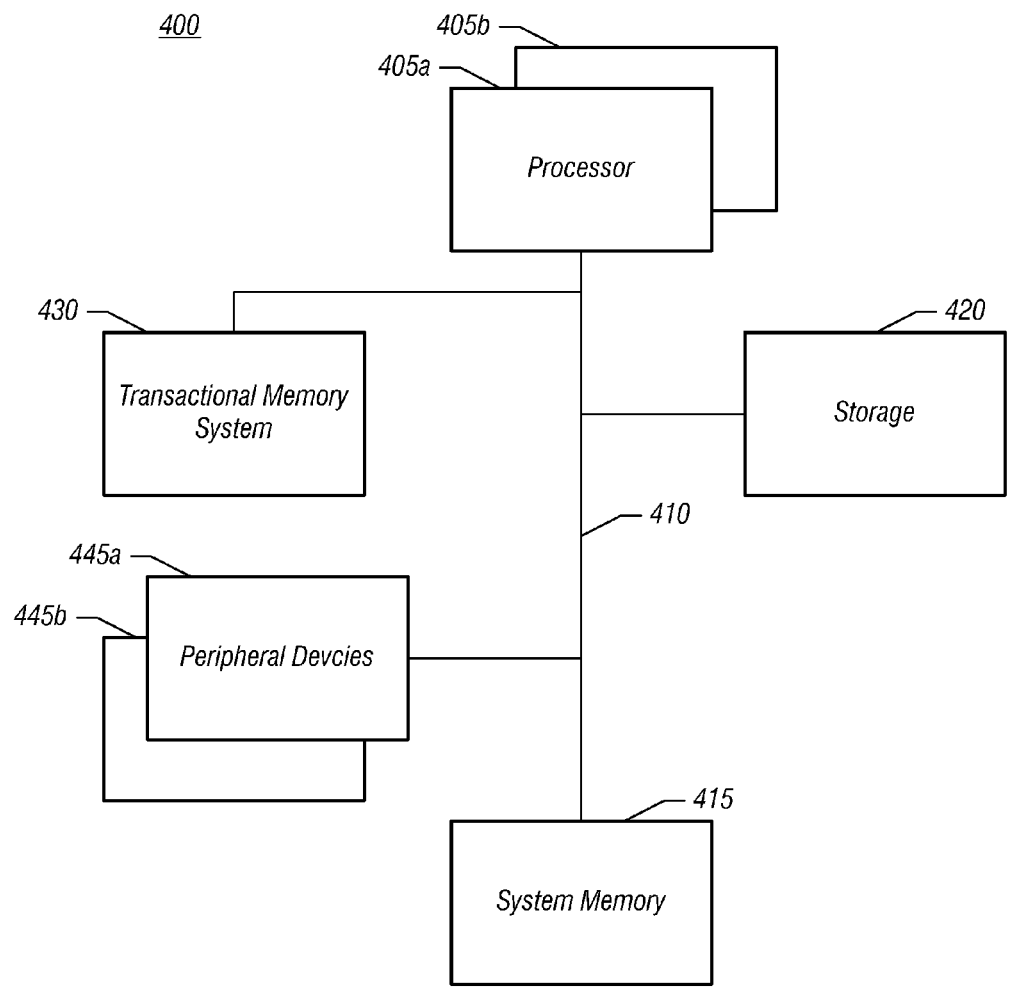
FIG. 6 is a block diagram of a system in accordance with an embodiment of the present invention.

Different system architectures may implement an STM for use with reader-writer locks. Referring now to FIG. 6, shown is a block diagram of a system in accordance with an embodiment of the present invention. As shown in FIG. 6, system 400 may be a computer system including a plurality of processors 405a and 405b. Processors 405a and 405b may be single core or multicore processors. In other embodiments, processors 405a and 405b may be cores of a single package multiprocessor, although the scope of the present invention is not limited in this regard.

Still referring to FIG. 6, processors 405a and 405b are coupled via a bus 410 to a system memory 415, which may be a dynamic random access memory (DRAM), in some embodiments and a storage 420, which may be a disk drive or other mass storage device. Further coupled to bus 410 may be a plurality of peripheral devices 445a and 445b, which may be network devices, multimedia devices and the like.

As further shown in FIG. 6, a transactional memory system 430 may be included in system 400. Transactional memory system 430 may implement a STM such that a thread executing on one of processors 405a and 405b may execute various operations of a transaction atomically. If the data used in the transaction remains concurrent from the time of access until the time of transaction commitment, the transaction commits normally. If instead, one or more accessed data values change prior to transaction commitment, the transaction may abort. Various shared memory locations within transactional memory system 430 may be protected by a lockword such as the reader-writer locks described herein. While shown with this particular implementation in the embodiment of FIG. 6, the scope of the present invention is not so limited.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing or transmitting electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a lock manager including a counter to maintain a count of aborted transactions and an inflation logic to control a mode of operation for a transactional memory system based at least in part on the count, the lock manager, in a first mode of operation, to enable a transaction to access data associated with a lock variable without acquiring the lock variable, use the data, commit if a value of the lock variable has not changed from the time of access to the time of commitment, and otherwise abort, wherein the lock manager is to increment the count of aborted transactions if the transaction is aborted, wherein the count is associated with a group of lock variables including the lock variable and the inflation logic is to dynamically change a mode of operation of the lock variable from an optimistic concurrency mode corresponding to the first mode of operation to a pessimistic concurrency mode based in part on the count.

2. The processor of claim 1, wherein the group corresponds to lock variables accessed by a first thread of a plurality of threads executing on the transactional memory system.

3. The processor of claim 1, wherein the inflation logic is to set a mode indicator in a control portion of the lock variable to dynamically change the mode of operation.

4. The processor of claim 1, wherein the lock manager is to upgrade a reader associated with the lock variable to a writer status.

5. The processor of claim 4, wherein the lock manager is to set an upgrade indicator in a control portion of the lock variable to upgrade the reader.

6. A method comprising:
maintaining a count of aborted transactions in a counter of a lock manager of a processor;
controlling a mode of operation for a transactional memory system based at least in part on the count;
enabling a transaction to access data associated with a lock variable without acquiring the lock variable, in a first mode of operation;
using the data to perform an operation of the transaction;
committing the transaction if a value of the lock variable has not changed from the time of access to the time of commitment, and otherwise aborting the transaction;
incrementing the count of aborted transactions if the transaction is aborted, wherein the count is associated with a group of lock variables including the lock variable; and
dynamically changing a mode of operation of the lock variable from an optimistic concurrency mode corresponding to the first mode of operation to a pessimistic concurrency mode based in part on the count.

7. The method of claim 6, wherein the group corresponds to lock variables accessed by a first thread of a plurality of threads executing on the transactional memory system.

8. The method of claim 6, further comprising setting a mode indicator in a control portion of the lock variable to dynamically change the mode of operation.

9. The method of claim 6, further comprising upgrading a reader associated with the lock variable to a writer status.

10. The method of claim 9, further comprising setting an upgrade indicator in a control portion of the lock variable to upgrade the reader.

11. At least one non-transitory computer readable medium including instructions that when executed enable a system to:
maintain a count of aborted transactions in a counter of a lock manager of a processor;
control a mode of operation for a transactional memory system based at least in part on the count;
enable a transaction to access data associated with a lock variable without acquiring the lock variable, in a first mode of operation;
use the data to perform an operation of the transaction; and
commit the transaction if a value of the lock variable has not changed from the time of access to the time of commitment, and otherwise abort the transaction;
increment the count of aborted transactions if the transaction is aborted, wherein the count is associated with a group of lock variables including the lock variable and the group corresponds to lock variables accessed by a first thread of a plurality of threads executing on the transactional memory system; and
dynamically change a mode of operation of the lock variable from an optimistic concurrency mode corresponding to the first mode of operation to a pessimistic concurrency mode based in part on the count, and set a mode indicator in a control portion of the lock variable to dynamically change the mode of operation.

12. The at least one non-transitory computer readable medium of claim 11, further comprising instructions that when executed enable the system to upgrade a reader associated with the lock variable to a writer status.

13. The at least one non-transitory computer readable medium of claim 12, further comprising instructions that when executed enable the system to set an upgrade indicator in a control portion of the lock variable to upgrade the reader.

* * * * *